US008601660B2

(12) United States Patent
Duty

(10) Patent No.: US 8,601,660 B2
(45) Date of Patent: Dec. 10, 2013

(54) RAILROAD TIE CLIP REMOVER

(76) Inventor: Leo Duty, Lebanon, VA (US)

( * ) Notice: Subject to any disclaimer, the term of this patent is extended or adjusted under 35 U.S.C. 154(b) by 370 days.

(21) Appl. No.: 12/975,413

(22) Filed: Dec. 22, 2010

(65) Prior Publication Data

US 2012/0159755 A1 Jun. 28, 2012

(51) Int. Cl.
*B23P 11/02* (2006.01)

(52) U.S. Cl.
USPC ................... 29/235; 29/270; 29/278; 254/21; 254/25

(58) Field of Classification Search
USPC ........... 29/235, 242, 241, 243, 244, 270, 278; 254/21, 25, 19, 18
See application file for complete search history.

(56) References Cited

U.S. PATENT DOCUMENTS

| | | | | |
|---|---|---|---|---|
| 5,865,425 | A * | 2/1999 | Meadows | 254/131 |
| 7,278,626 | B1 * | 10/2007 | Chang | 254/25 |
| 8,393,596 | B2 * | 3/2013 | Lindskog | 254/104 |
| 2007/0158626 | A1 * | 7/2007 | Chang | 254/25 |
| 2010/0314593 | A1 * | 12/2010 | Fan | 254/25 |
| 2011/0073816 | A1 * | 3/2011 | Nolle | 254/25 |
| 2012/0159755 | A1 * | 6/2012 | Duty | 29/235 |

* cited by examiner

*Primary Examiner* — Lee D Wilson
(74) *Attorney, Agent, or Firm* — Pitts & Lake, P.C.

(57) ABSTRACT

An apparatus for removing rail tie clips comprises an elongated handle end section and a grasping end section extending from the outboard end of the elongated handle end section. The grasping end section terminates in a tooth oriented generally perpendicularly to the handle end section.

6 Claims, 4 Drawing Sheets

RAILROAD TIE CLIP REMOVER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to railroad tie clips.

More particularly, this invention pertains to a tool for removal of railroad tie clips.

2. Description of the Related Art

Although railroad rails are commonly secured to wooden ties, which may be relatively easily pierced with spikes, for example, there are certain places where concrete ties are preferred. For example, concrete ties are often preferred on tighter curves and when the railroad is intended to carry very heavy loads.

When concrete ties are used for a rail bed, alternative means are generally used for securing the rails to the ties. One means includes a pair of brackets set into the concrete tie at the time of molding the tie. The rail is set between the pair of brackets. The brackets are spaced apart by the width of the base of the rail. A generally U-shaped clip is then forcibly inserted, as with a hammer, for example, into each of the brackets to extend over the bottom section of the rail and thus secure the rail to the concrete tie. The clips are generally formed from steel rod which is not easily deformable, but nevertheless sufficiently deformable for forcible insertion into a bracket, often with a heavy hammer.

When a rail is damaged or excessively worn, it must be replaced. Accordingly, the clips must be removed. Removal of the clips has presented difficulties. Railroad repair workers have tried various tools to remove the clips and have spent inordinate time and incurred many serious injuries struggling with removal of the securing clips.

It is therefore desirable to provide a tool for quick and safe removal of the securing clips.

BRIEF SUMMARY OF THE INVENTION

According to one embodiment of the present invention, a tool is provided for quick and safe removal of securing clips. An apparatus for removing rail tie clips comprises an elongated handle end section and a grasping end section extending from the outboard end of the elongated handle end section. The grasping end section terminates in a tooth oriented generally perpendicularly to the handle end section.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
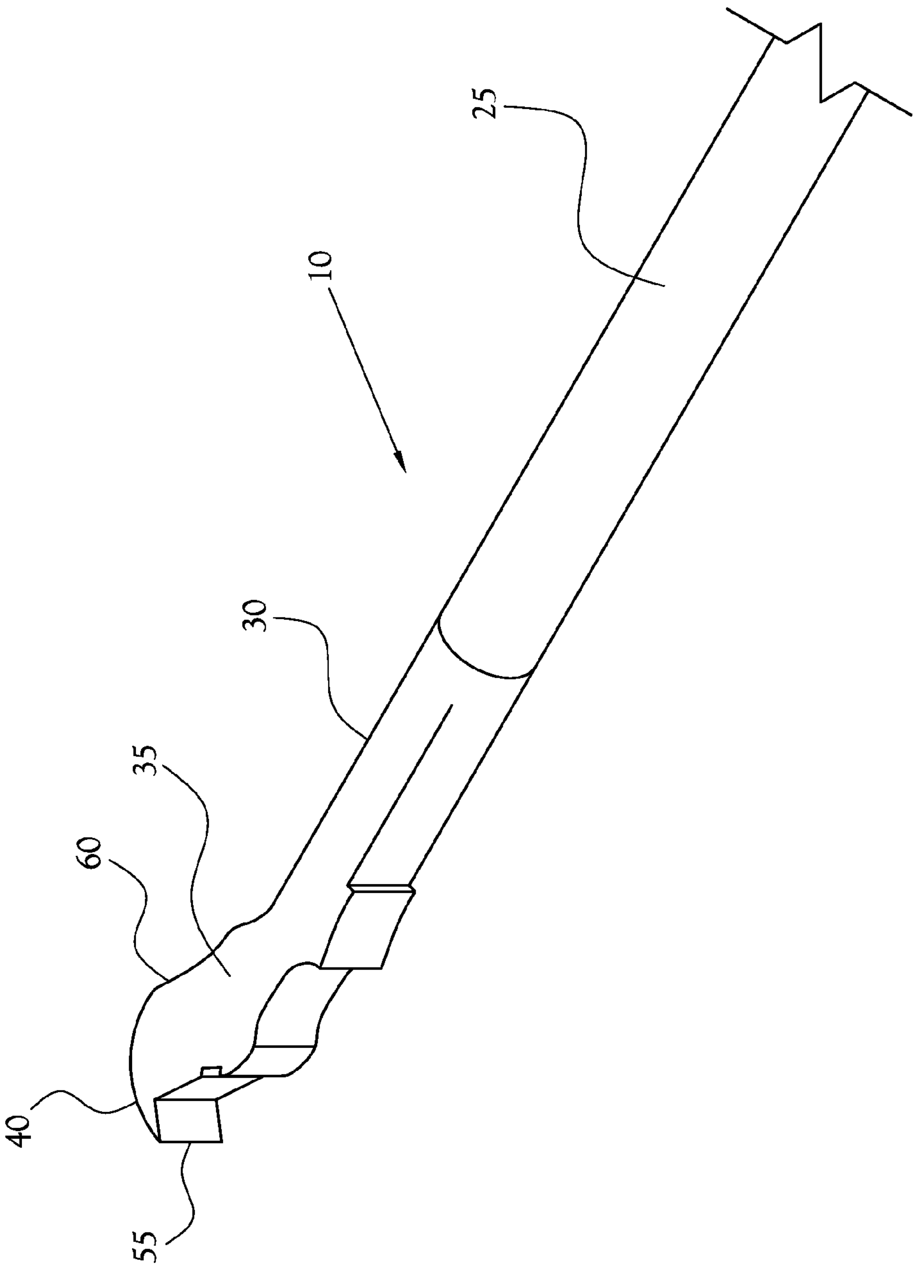
FIG. 1 is a perspective view of a railroad tie clip remover embodying various of the features of the present invention.
Figure 2:
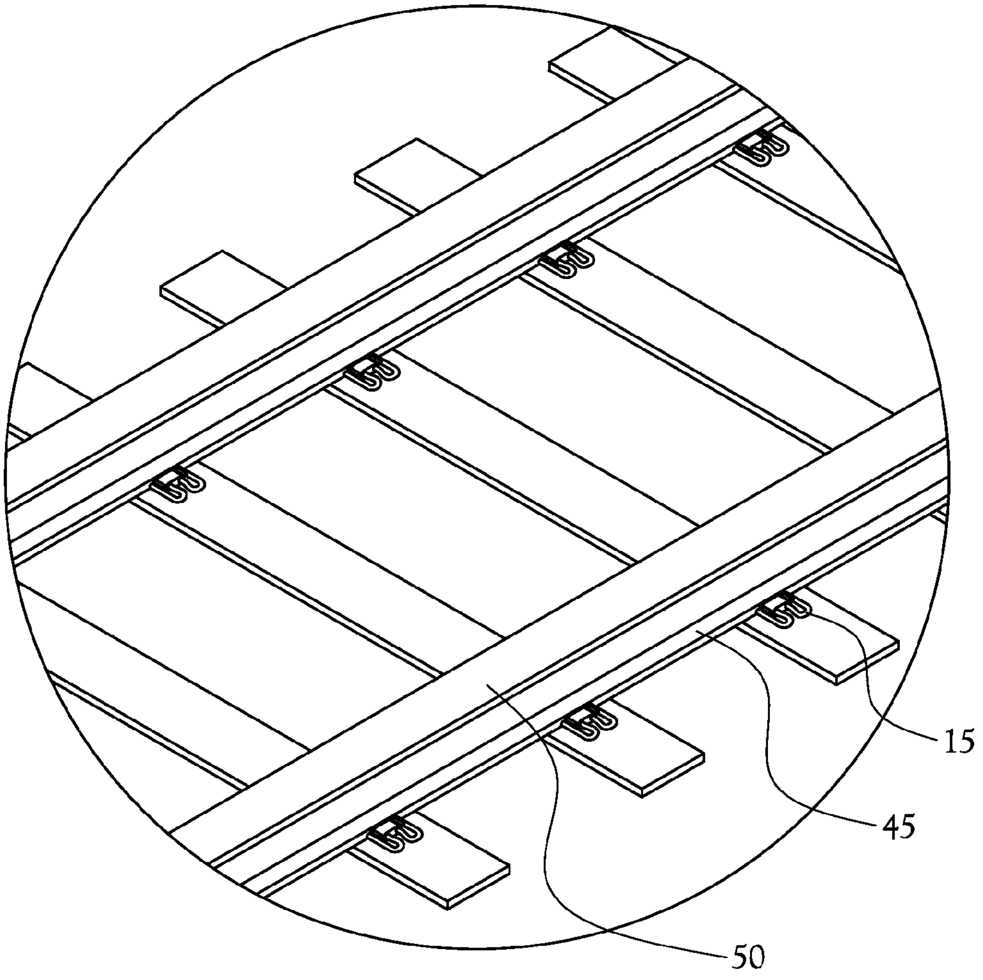
FIG. 2 is a plan view of a clip securing a rail to a bracket secured to a tie.
Figure 3:
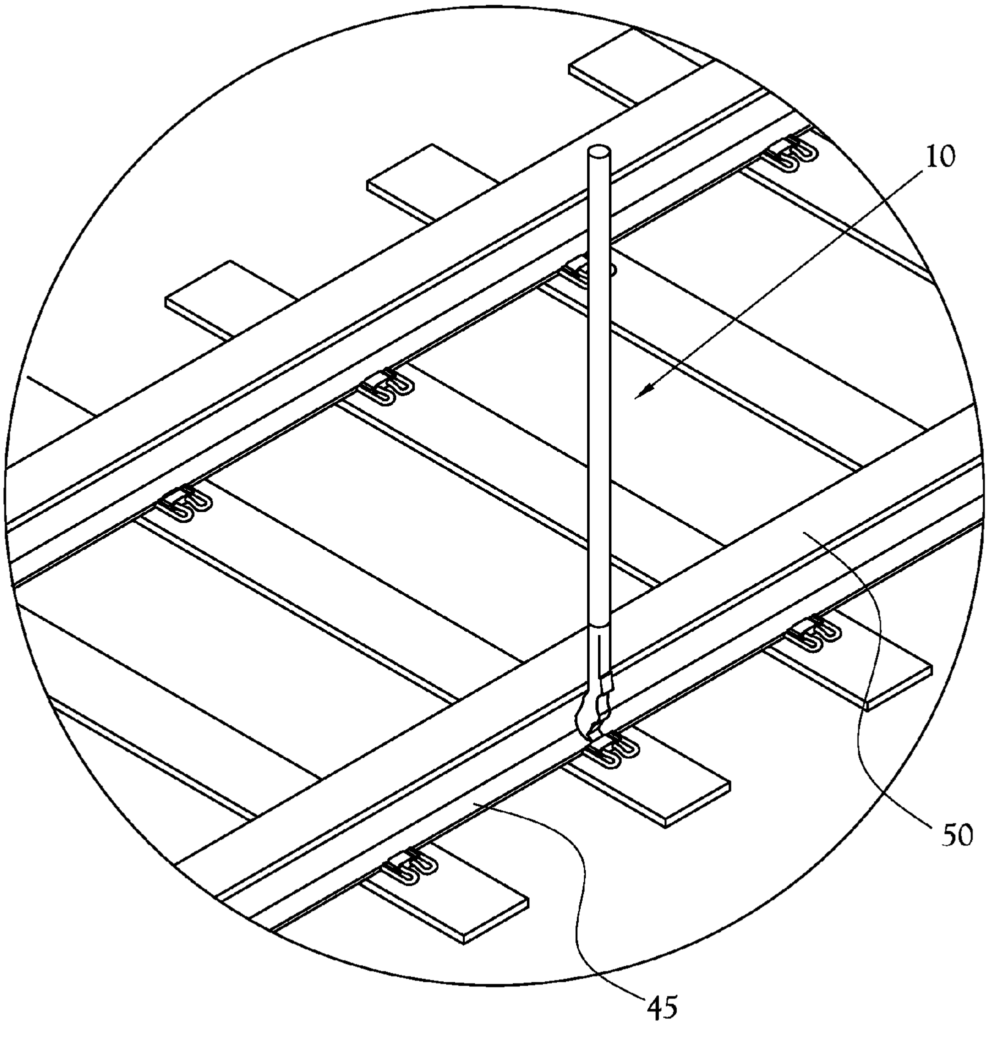
FIG. 3 is an elevation view of the clip remover of FIG. 1 in position to remove the clip depicted in FIG. 2.
Figure 4:
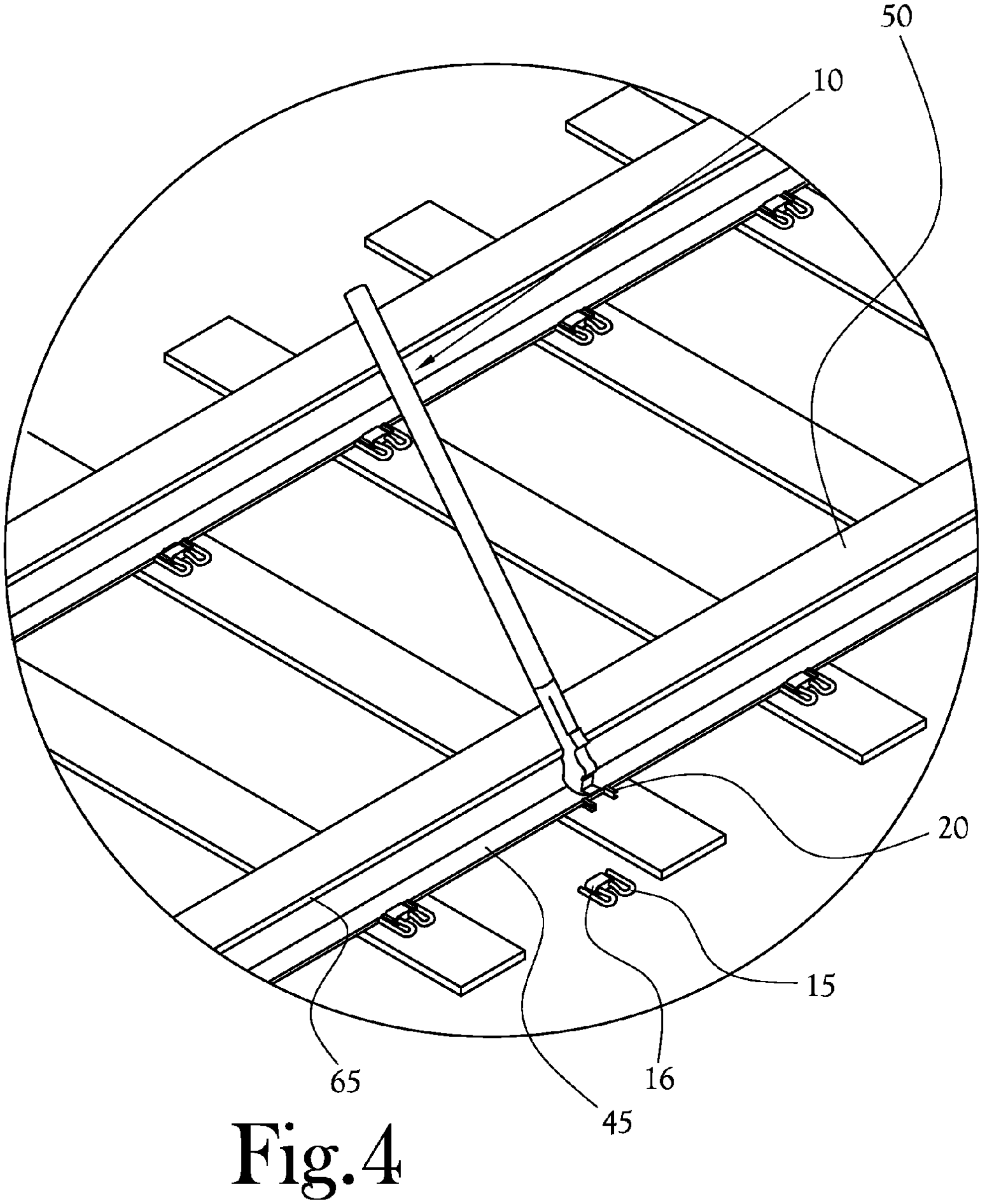
FIG. 4 is an elevation view of the clip remover of FIG. 1 in position after removal of the clip depicted in FIG. 2.

An apparatus for removal of retaining clips from railroad tie brackets is disclosed.

Referring to the drawings, in which similarly numbered parts refer to similar parts, a clip remover 10 for removal of a clip 15 from a railroad tie bracket 20 is disclosed. The tie bracket 20 includes two generally parallel grooves which are adapted to receive two generally parallel legs of the clip 15. The central portion of the clip 15, located between the legs 16 overlays the base 45 of the rail 50.

The clip remover 10 comprises an elongated tool having a handle end section 25 and an opposed grasping end section 30. The handle end section 25 is generally cylindrical in shape and preferably about four feet in length and about one inch in diameter. Preferably the clip remover is cast or forged steel.

The grasping end section 30 includes a head 35 which extends at an angle of about 15 degrees from the axis of the handle end section 25. The head 35 terminates in a tooth 40 having a width which is less than the distance between the grooves of the tie bracket 20. The tooth 40 terminates in an edge 55.

The surface 60 of the head 35 is arcuate in shape to engage the top edge 65 of the rail 50.

In operation, the clip remover 10 is situated between the rail 50 and the clip 15 securely engaged in the tie bracket 20, with the edge 55 of the tooth 40 abutting the clip 15 and with the opposed surface 60 resting against the top edge 65 of the rail 50. The application of pressure against the rail edge 60 causes the tooth 40 to ease the clip 15 from the bracket 20.

From the foregoing description, it will be recognized by those skilled in the art that a safe and easily operated railroad tie clip remover has been provided.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for removing rail tie clips, said apparatus comprising:

an elongated handle end section; and a grasping end section extending from an outboard end of said elongated handle end section, said grasping end section having a proximal end secured to said handle end section and a distal end terminating in a tooth oriented generally perpendicularly to said handle end section, said grasping end section further defining:

a first working surface extending between said tooth and said handle end section, said first working surface defining:

a first substantially planar surface extending distally of said grasping end section proximal end toward said tooth;

a first concave surface formed distally of said first substantially planar surface, said first concave surface being shaped to surround and conform to a side portion of an upper flange of a railroad rail;

a first protruding surface formed distally of said first concave surface, said first protruding surface being shaped to extend toward and conform to a portion of a central web of a railroad rail; and a second substantially planar surface extending between said first protruding surface and said tooth; and a second working surface opposite said first working surface, said second working surface extending from said grasping end section proximal end around a distal end of said grasping end section to said tooth, said second working surface defining:

a second concave surface formed distally of said grasping end section proximal end, said second concave surface being shaped to surround and conform to a side portion of an upper flange of a railroad rail;

a second protruding surface formed distally of said concave surface, said second protruding surface being shaped to extend toward a portion of a central web of a railroad rail; and an arcuate surface extending from said second protruding surface around a distal end of said grasping end section to said tooth.

2. The apparatus of claim 1 wherein said grasping end section is oriented at an angle of about 15 degrees from said handle end section.

3. The apparatus of claim 1 further including a groove extending along said first working surface, perpendicular to a long dimension of said handle end section, between said first protruding surface and said second planar surface.

4. The apparatus of claim 3, said grasping end section proximal end having a proximal portion defining a cylindrical shape and tapering to a distal portion defining a rectangular cross-section.

5. The apparatus of claim 4, said first planar surface being outwardly offset from said grasping end section proximal end in a direction perpendicular to said long dimension of said handle end section.

6. The apparatus of claim 5, said grasping end surface further defining oppositely disposed first and second side surfaces extending substantially parallel to one another between said first and second working surfaces and defining a width of said apparatus.

* * * * *